(12) United States Patent
Kayano et al.

(10) Patent No.: US 10,415,107 B2
(45) Date of Patent: Sep. 17, 2019

(54) METHOD FOR LOADING AND DEPOSITING LOADED MATERIAL IN BLAST FURNACE, LOADED MATERIAL SURFACE DETECTION DEVICE, AND METHOD FOR OPERATING BLAST FURNACE

(71) Applicant: WADECO CO., LTD., Hyogo (JP)

(72) Inventors: Hayae Kayano, Hyogo (JP); Kenji Kurose, Hyogo (JP)

(73) Assignee: WADECO CO., LTD., Amagasaki-Shi (JP)

( * ) Notice: Subject to any disclaimer, the term of this patent is extended or adjusted under 35 U.S.C. 154(b) by 278 days.

(21) Appl. No.: 15/123,917

(22) PCT Filed: Oct. 31, 2014

(86) PCT No.: PCT/JP2014/079114
§ 371 (c)(1),
(2) Date: Sep. 6, 2016

(87) PCT Pub. No.: WO2015/133005
PCT Pub. Date: Sep. 11, 2015

(65) Prior Publication Data
US 2017/0016080 A1    Jan. 19, 2017

(30) Foreign Application Priority Data

Mar. 4, 2014  (JP) ................................. 2014-041909
Jul. 24, 2014  (JP) ................................. 2014-150765

(51) Int. Cl.
*C21B 5/00*      (2006.01)
*F27D 21/00*   (2006.01)
(Continued)

(52) U.S. Cl.
CPC ............. *C21B 5/006* (2013.01); *C21B 5/008* (2013.01); *F27B 1/20* (2013.01); *F27D 3/08* (2013.01);
(Continued)

(58) Field of Classification Search
CPC . C21B 5/006; C21B 5/008; F27B 1/20; F27D 21/0028; F27D 3/08; F27D 3/10;
(Continued)

(56) References Cited

U.S. PATENT DOCUMENTS 3,821,738 A * 6/1974 Quesinberry et al. .. G01S 13/68
342/77
5,043,735 A    8/1991 Mawhinney et al.
(Continued)

FOREIGN PATENT DOCUMENTS

CN   203415663 U   1/2014
EP   2 363 694 A1  9/2011
(Continued)

OTHER PUBLICATIONS

JP2012237560, English machine traslation version, Shigeji et al, Profile measurement apparatus for objects cgarged into blast furnace, Dec. 6, 2012, 13 pages (Year: 2012).*
(Continued)

*Primary Examiner* — Scott R Kastler
*Assistant Examiner* — Michael Aboagye
(74) *Attorney, Agent, or Firm* — Seed IP Law Group LLP

(57) ABSTRACT

A detection wave from a transmitting/receiving means is guided to the interior of a blast furnace via an antenna and a reflecting plate, and when a reflected wave from the surface of a loaded material is reflected by the reflecting plate and received by the transmitting/receiving means, the reflecting plate is rotated together with the antenna, or the reflecting plate is rotated additionally, and the surface profile
(Continued)

of the loaded material is measured by scanning the surface of the loaded material in a linear manner or a planar manner during the turning of a chute or for each prescribed turn of the chute. A deposition profile is obtained on the basis of this surface profile and is compared to a predetermined theoretical deposition profile, and the chute is controlled so as to correct the error with respect to the theoretical deposition profile and then which new loaded material is introduced.

12 Claims, 12 Drawing Sheets

(51) Int. Cl.
    *G01S 13/08*     (2006.01)
    *F27D 3/08*     (2006.01)
    *G01B 15/04*     (2006.01)
    *G01S 7/03*     (2006.01)
    *G01S 13/89*     (2006.01)
    *G01B 11/24*     (2006.01)
    *G01S 13/88*     (2006.01)
    *F27B 1/20*     (2006.01)
    *F27D 3/10*     (2006.01)
    *G01S 13/34*     (2006.01)

(52) U.S. Cl.
    CPC ........... *F27D 3/10* (2013.01); *F27D 21/0028* (2013.01); *G01B 11/24* (2013.01); *G01B 15/04* (2013.01); *G01S 7/03* (2013.01); *G01S 13/08* (2013.01); *G01S 13/34* (2013.01); *G01S 13/882* (2013.01); *G01S 13/89* (2013.01)

(58) Field of Classification Search
    CPC ......... G01B 11/24; G01B 15/04; G01S 13/08; G01S 13/34; G01S 13/882; G01S 13/89; G01S 7/03
    USPC .................. 266/92, 93, 94, 78, 44; 342/124; 73/290 R; 414/148
    See application file for complete search history.

(56) References Cited

U.S. PATENT DOCUMENTS

| | | | | |
|---|---|---|---|---|
| 5,844,527 | A | * 12/1998 | Takashima | ............... H01Q 3/04 343/781 P |
| 2014/0047917 | A1 | 2/2014 | Vogt et al. | |
| 2015/0338955 | A1 | 11/2015 | Hamaguchi | |
| 2017/0331183 | A1 | 11/2017 | Lenk | |

FOREIGN PATENT DOCUMENTS

| | | | | |
|---|---|---|---|---|
| GB | 2 039 365 | A | 8/1980 | |
| JP | 61-290378 | A | 12/1986 | |
| JP | 6-11328 | A | 1/1994 | |
| JP | 7-34107 | A | 2/1995 | |
| JP | 2011-145237 | A | 7/2011 | |
| JP | 2012-67340 | A | 4/2012 | |
| JP | 2012-237560 | A | 12/2012 | |
| JP | 2012237560 | | * 12/2012 | ............. C21B 5/006 |
| JP | 5391458 | B2 | 10/2013 | |
| RU | 2 277 588 | C1 | 6/2006 | |
| WO | 2006/118485 | A1 | 11/2006 | |
| WO | 2006/118685 | A1 | 11/2006 | |
| WO | 2010/144936 | A1 | 12/2010 | |
| WO | 2014/084089 | A1 | 6/2014 | |

OTHER PUBLICATIONS

European Office Action, dated Jul. 3, 2018, for European Application No. 14 884 852.6-1103, 9 pages.
International Search Report, dated Jan. 20, 2015, for International Application No. PCT/JP2014/079114, 2 pages.
Observations by a Third Party, dated Apr. 24, 2018, for European Application No. 14884852.6-1103, 7 pages.

* cited by examiner

METHOD FOR LOADING AND DEPOSITING LOADED MATERIAL IN BLAST FURNACE, LOADED MATERIAL SURFACE DETECTION DEVICE, AND METHOD FOR OPERATING BLAST FURNACE

TECHNICAL FIELD

The present invention relates to a device configured to transmit a detection wave such as a micrometer wave, a millimeter wave or the like into a blast furnace, to detect the detection wave reflected from iron ore or coke loaded in the furnace and to detect a loading volume and a surface profile. Also, the present invention relates to a technology of controlling a deposition profile of a loaded material such as iron ore or coke to be loaded in a blast furnace.

RELATED ART

A blast furnace is provided with an opening in the vicinity of a furnace top. A detection wave (transmission wave) is transmitted into the furnace through the opening and a detection wave (reflected wave) reflected from iron ore or coke loaded in the furnace is received, so that a distance to the iron ore or the coke and a surface profile of the iron ore or the coke are detected from a time difference between the transmission wave and the reflected wave or the like. In the meantime, as the detection wave, a micrometer wave or a millimeter wave is used because they can be used at high temperatures and are difficult to be influenced by floating matters, water vapors and the like in the furnace.

As a detection device, in Patent Document 1, for example, as shown in FIG. 12, a micrometer wave from a micrometer wave transmitting/receiving unit 3 is transmitted toward a loaded material 7 (iron ore 7a or coke 7b) in a blast furnace 6 through an antenna 2 in the vicinity of a tip opening of a lance 1 inserted into the blast furnace 6 and the micrometer wave reflected from a surface of the loaded material 7 is received by the antenna 2 and is detected by the micrometer wave transmitting/receiving unit 3, so that a distance to the surface of the loaded material 7 is obtained from a time difference between the transmission and the reception. At this time, the lance 1 is reciprocally moved from a furnace wall 5 toward a furnace core (denoted with a broken line 4), so that a deposition profile of the loaded material 7 is obtained.

However, according to the detection device of Patent Document 1, the lance 1 is a long member corresponding to a radius of the furnace, is hung downward due to an own weight and is inseparable from the furnace, and has a long stroke for movement, so that a large space is required outside the furnace. Also, a driving unit configured to move the lance 1 is required. Therefore, the applicant suggested a detection device in Patent Document 2 where a reflecting plate is installed just above the opening of the blast furnace, the antenna is installed to face a reflecting surface of the reflecting plate, the transmission wave is transmitted from the detection wave transmitting/receiving unit through the antenna, is reflected on the reflecting surface of the reflecting plate and is then enabled to enter the furnace through the opening, the reflected wave reflected from the iron ore or the coke in the furnace is enabled to return to the reflecting plate through the opening, is again reflected and is sent to the transmitting/receiving unit, and a reflecting angle of the reflecting surface is changed by an angle varying unit, so that the surface of the iron ore or the coke is scanned by the transmission wave to detect a surface profile.

However, according to the detection device of Patent Document 2, the antenna is fixed, the reflecting plate is installed to face the antenna, and the angle varying device is installed on a backside (a surface opposite to the antenna) of the reflecting plate. Since the antenna is coupled with the transmitting/receiving unit, when the antenna and the reflecting plate are installed to face each other, the transmitting/receiving unit, the antenna, the reflecting plate and the angle varying unit are arranged substantially in a line, so that a distance from the transmitting/receiving unit to the angle varying unit increases.

Also, as shown in FIG. 12, in the blast furnace, the iron ore 7a and the coke 7b are alternately loaded from the furnace top by a large bell 8 (a bell-type loading device) or a chute (10; refer to FIG. 1) and are deposited into a layer shape, and an operation is performed so that a deposition profile of the loaded material 7 becomes an inverted bell shape such as an antlion's pit.

One important factor for stably operating the blast furnace is a gas stream distribution in the furnace. The gas stream distribution closely relates to a deposition situation of the iron ore or the coke. In general, a deposition state where the gas stream distribution is most suitable, i.e., a theoretical deposition profile where an angle of an inclined surface of a deposited material, a layer thickness ratio of the deposition layer of the iron ore and the deposition layer of the coke and the like are most suitable is obtained by a test, and an operation of the large bell or the chute is controlled so that an actual deposition state coincides with the theoretical deposition profile.

Also in the detection device of Patent Document 1, the measurement is performed whenever each of the iron ore 7a and the coke 7b is deposited to be a predetermined thickness in conformity to the theoretical deposition profile, and a moving range (inclined angle) of a movable arm 9 is controlled so that the thickness of each deposition layer of the iron ore 7a and the coke 7b is not varied every each loading.

In order to make the actual deposition profile closer to the theoretical deposition profile, it is necessary to increase a measurement frequency. However, according to the method of Patent Document 1, since the lance 1 becomes an obstacle upon the loading of the iron ore 7a or the coke 7b, it is necessary to pull out the lance 1 outside the furnace while loading the iron ore 7a or the coke 7b. Therefore, it is not possible to measure the deposition profile of the iron ore 7a or the coke 7b until one loading is completed. Also, since it takes for the lance 1 to reciprocate, it is not possible to perform the measurement rapidly. For this reason, a gap with the theoretical deposition profile increases.

Also, as a unit configured to alternately load the iron ore 7a and the coke 7b, a method of loading and depositing the iron ore 7a and the coke 7b in the furnace by the turning of the chute has been known, as described above. Also in the method of using the chute, the micrometer wave measurement device is mounted in the vicinity of the furnace top, the deposition surface of the iron ore 7a or the coke 7b is scanned by the micrometer wave to measure the deposition profile. However, according to the micrometer wave measurement device of the related art, including the method of using the lance 1, it takes to scan the deposition surface and there is a room for improvement in the measurement frequency.

Also, it is possible to perform the more correct loading operation if the deposition profile of the iron ore 7a or the coke 7b can be measured over an entire surface in the furnace. To this end, it is necessary to two-dimensionally scan the micrometer wave. In the detection device of Patent Document 2, the reflecting plate is attached to support members so that it can be freely rotatable about support shafts provided at both ends, the support members are rotated about axis lines thereof and rod-shaped pieces attached to the backside of the reflecting plate are linearly moved so as to perpendicularly intersect with the support shafts, so that the inclined angle of the reflecting surface toward the furnace is two-dimensionally changed.

However, the rotating mechanism of the reflecting plate should be configured to control the rotation of the support members and the movement of the rod-shaped pieces at the same time, so that the rotating mechanism is complicated and the measurement device becomes enlarged. Further, it is necessarily required to correctly control the rotation of the support members and the movement of the rod-shaped pieces, so that it may be considerably difficult to perform the operation more rapidly. Also, the blast furnace is under high pressure and high temperature and has problems such as collision of the iron ore and the coke and introduction of dusts, which have not been sufficiently solved.

CITATION LIST

Patent Documents

Patent Document 1: Japanese Patent Application Publication No. Hei 7-34107A
Patent Document 2: Japanese Patent No. 5,391,458B

SUMMARY OF THE INVENTION

Problems to be Solved

It is therefore an object of the present invention to make a device small, to simplify a rotating mechanism of a reflecting plate and to perform control more correctly even when a surface of a loaded material is scanned in a planar manner, and to measure a deposition profile of iron ore or coke every each turning of a chute or every each prescribed turn of the chute by performing the measurement more rapidly, thereby making an actual deposition profile closer to a theoretical deposition profile to perform an optimal blast furnace operation.

Means for Solving the Problems

In order to solve the above object, the present invention provides a method for loading and depositing a loaded material in a blast furnace, a loaded material surface detection device and a method for operating a blast furnace, which will be described in the below.

(1) A surface detection device of a loaded material in a blast furnace, which comprises a reflecting plate installed just above an opening provided in the vicinity of a furnace top of the blast furnace and having a reflecting surface inclined toward the opening, an antenna installed to face the reflecting surface of the reflecting plate and a waveguide configured to couple the antenna and a detection wave transmitting/receiving unit, wherein the device is configured to transmit a detection wave from the antenna to the reflecting surface of the reflecting plate, to enable the detection wave to enter the furnace through the opening, to enable the detection wave reflected from the loaded material in the furnace to return to the reflecting surface of the reflecting plate through the opening, to send the same to the antenna, to detect the detection wave by the detection wave transmitting/receiving unit and to detect a distance to a surface of the loaded material or a surface profile of the loaded material, the device comprising:

a waveguide rotating unit configured to rotate the waveguide about an axis line of the waveguide by a predetermined angle, wherein the antenna and the reflecting plate are coupled by a coupling member and the reflecting plate is configured to rotate about the axis line of the waveguide together with rotation of the antenna by the waveguide rotating unit.

(2) The surface detection device of a loaded material in a blast furnace according to the above (1), further including a reflecting plate rotating unit configured to tilt the reflecting surface toward an antenna-side and an opposite side to the antenna by a predetermined angle, wherein the detection wave is two-dimensionally scanned by the reflecting plate rotating unit and the waveguide rotating unit.

(3) The surface detection device of a loaded material in a blast furnace according to the above (2), wherein the reflecting plate rotating unit is provided on the axis line of the waveguide on a backside of the reflecting plate and is configured to rotate integrally with the waveguide.

(4) The surface detection device of a loaded material in a blast furnace according to the above (2) or (3), wherein support shafts are attached at both diametrical ends of the reflecting plate and the reflecting plate is connected to a support member extending from the coupling member so that it can be freely rotatable about the support shafts, and wherein the reflecting plate rotating unit includes a piston rod configured to linearly move toward the antenna-side or the opposite side to the antenna along the axis line of the waveguide and a rod-shaped member having one end attached to a tip of the piston rod and the other end attached to the backside of the reflecting plate with deviating upward or downward from a center of rotation of the reflecting plate, and is configured to move an attachment part between the other end of the rod-shaped member and the backside of the reflecting plate toward the antenna-side or the opposite side to the antenna by the piston rod.

(5) The surface detection device of a loaded material in a blast furnace according to one of the above (1) to (4), wherein the antenna is a horn antenna and the reflecting surface of the reflecting plate is a concave surface curved into a convex shape toward an opposite side to an antenna surface of the antenna.

(6) The surface detection device of a loaded material in a blast furnace according to one of the above (1) to (4), wherein the antenna is a born antenna having a lens and the reflecting surface of the reflecting plate is a planar surface.

(7) The surface detection device of a loaded material in a blast furnace according to one of the above (1) to (6), wherein an opening of the antenna is covered by a non-porous partition wall formed of a heat resistant material.

(8) The surface detection device of a loaded material in a blast furnace according to the above (7), wherein a filter made of a heat resistant material is disposed on a front surface of the non-porous partition wall facing toward the reflecting plate.

(9) The surface detection device of a loaded material in a blast furnace according to one of the above (1) to (8), wherein an inert gas is to be sprayed onto the reflecting surface of the reflecting plate.

(10) The surface detection device of a loaded material in a blast furnace according to one of the above (1) to (9), wherein during non-measurement, the reflecting plate is rotated by 180° together with the waveguide, thereby making a backside of the reflecting plate face the opening of the blast furnace.

(11) A method for loading and depositing a loaded material such as iron ore, coke and the like in a blast furnace by a chute, wherein the surface detection device according to one of the above (1) to (10) is provided, the method comprising:

completing a transmitting/receiving operation of scanning a surface of the loaded material by the detection wave within one turning of the chute or within a prescribed number of turning times of the chute; and loading the loaded material while measuring a surface profile of the loaded material during the turning of the chute or every each prescribed turn of the chute.

(12) The method according to the above (11), wherein a deposition profile of the loaded material is obtained on the basis of the surface profile and is compared to a predetermined theoretical deposition profile, and the chute is controlled so as to correct an error with respect to the theoretical deposition profile and then a new loaded material is loaded.

(13) A method for operating a blast furnace, the method comprising:

loading and depositing a loaded material into the blast furnace by the method according to the above (11) or (12); and operating the blast furnace.

Effects of the Invention

According to the detection device of the present invention, since the reflecting plate is rotated together with the antenna, it is not necessary to provide an angle varying unit for the reflecting plate and it is possible to shorten an entire length by a magnitude corresponding to the angle varying unit, thereby saving a space. Also, even when scanning the surface of the loaded material in the planar manner, it is sufficient to simply control the tilting of the reflecting plate toward the furnace and it is possible to simplify the rotating mechanism of the reflecting plate and the control thereof.

Also, it is possible to rapidly measure the deposition profile of the iron ore or the coke and to measure the deposition profile after the chute turns by the prescribed number of times or whenever the iron ore or the coke is loaded. For example, when the loaded material is loaded and deposited so as to coincide with the theoretical deposition profile, it is possible to deposit the iron ore or the coke and to perform the optimal blast furnace operation by remarkably removing the error with respect to the theoretical deposition profile. Further, it is possible to rapidly scan the surface of the loaded material in the planar manner, so that it is possible to deposit the loaded material more correctly.

DETAILED DESCRIPTION OF ILLUSTRATIVE EMBODIMENT

Hereinafter, the present invention will be described in detail with reference to the drawings.

Figure 1:
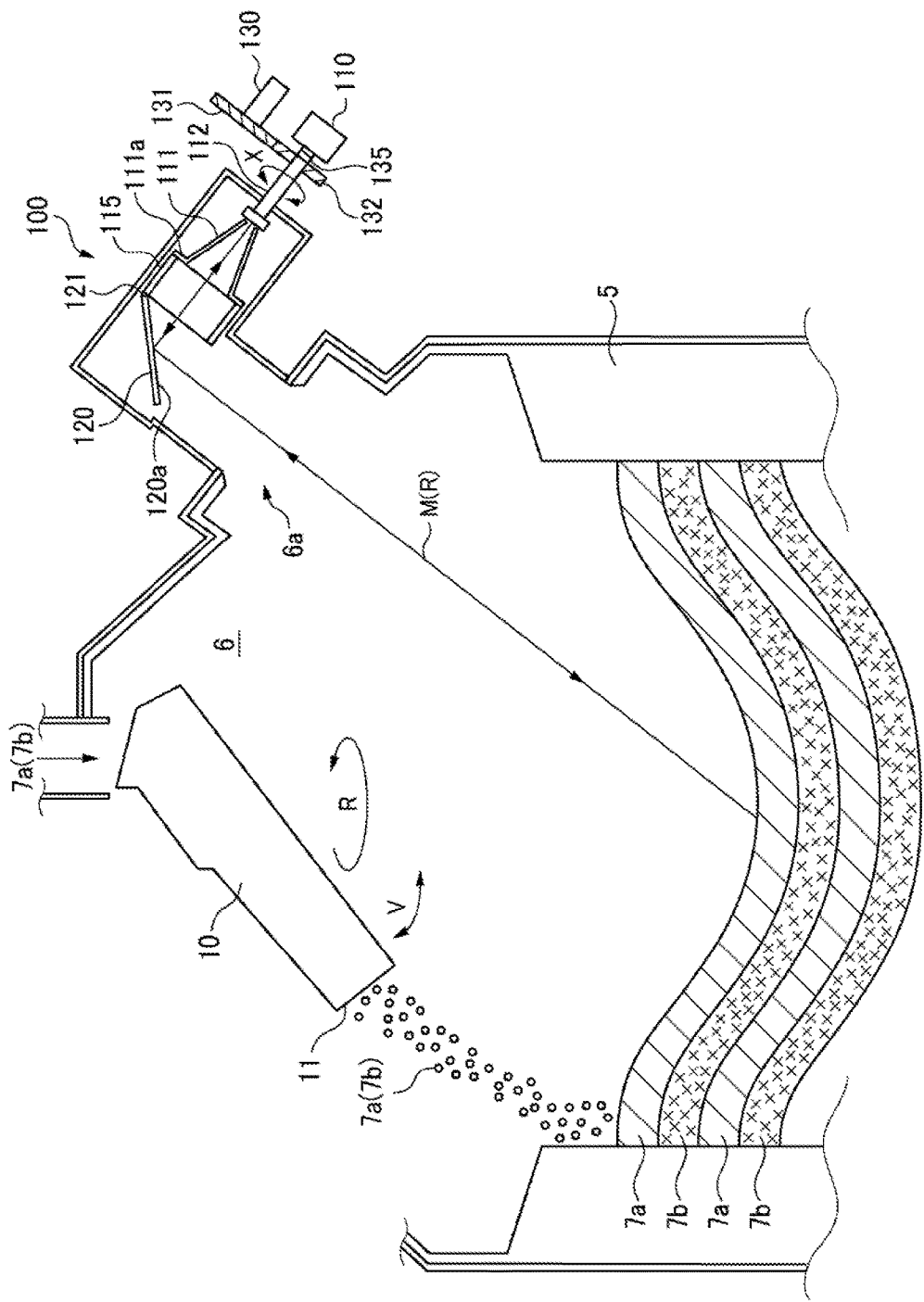
FIG. 1 depicts an overall configuration of a measurement device for implementing a method for loading and depositing a loaded material in accordance with the present invention.
Figure 9:
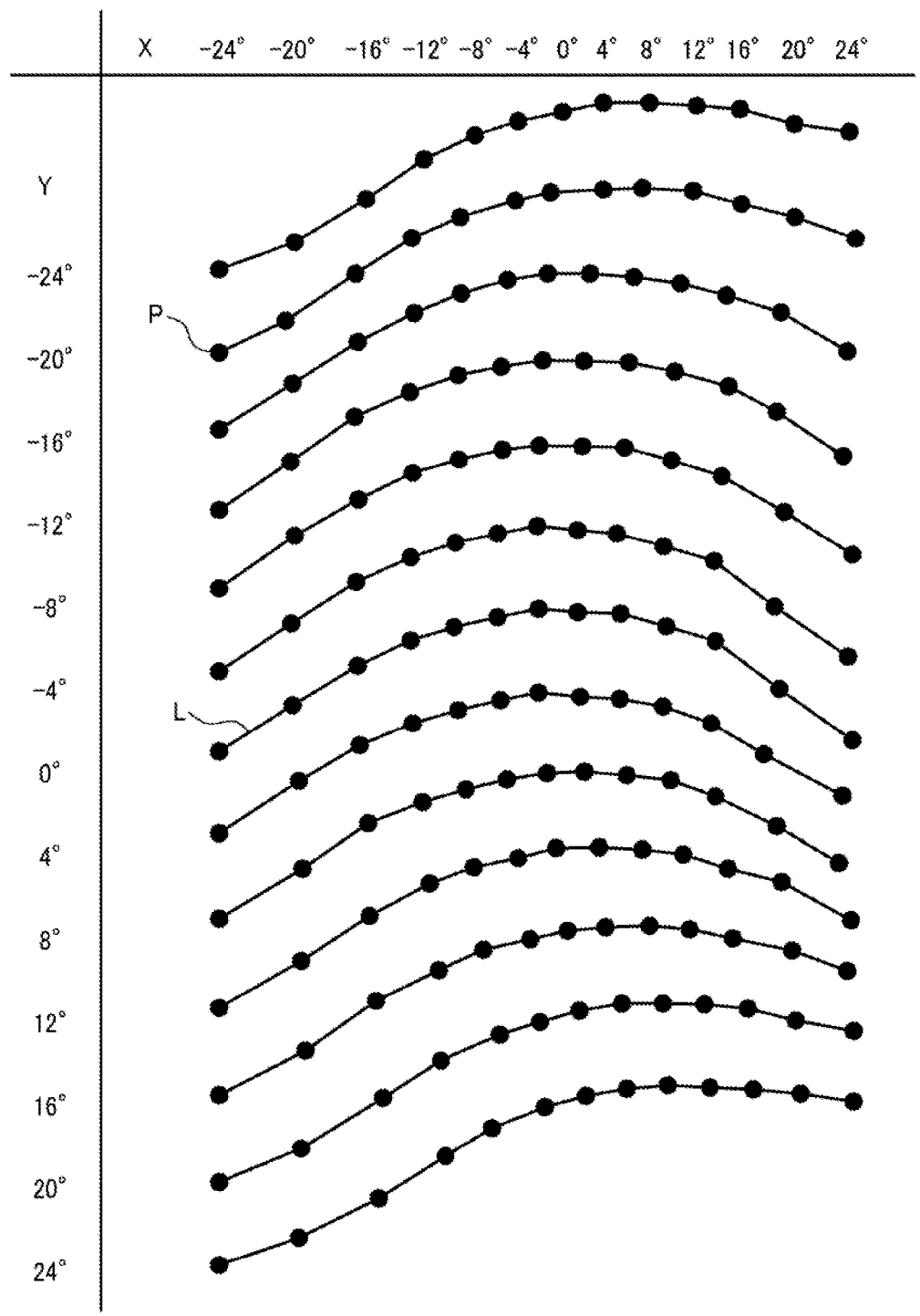
FIG. 9 depicts a two-dimensional profile, which is to be obtained by the scanning in the planar manner.

FIG. 1 depicts a device configuration fix implementing a method of the present invention, showing a section of a blast furnace in accordance with FIG. 9.

A chute 10 for loading iron ore 7a and coke 7b is installed at a furnace top of a blast furnace 6. The chute 10 is configured to load the iron ore 7a and the coke 7b to a predetermined position in the furnace from a drop port 11 by movement having combined horizontal turning as shown with an arrow R and pendulum motion as shown with an arrow V. Also, a measurement device 100 for measuring a deposition profile of the loaded material 7 (the iron ore 7a or the coke 7b) is mounted in the vicinity of the furnace top, for example, at a side of the chute 10 outside the furnace.

The measurement device 100 has an antenna 111, which couples to a detection wave transmitting/receiving unit 110 through a waveguide 112, and a metallic reflecting plate 120, which are installed to face each other. The reflecting plate 120 is inclined downward by 45° so that a reflecting surface 120a of the reflecting plate 120 faces toward an opening 6a of the blast furnace 6. In the meantime, as the detection wave, a micrometer wave or a millimeter wave, which are difficult to be influenced by heat or water vapors in the furnace, is used.

Also, the reflecting plate 120 and the antenna 111 are coupled by a coupling member 115. The coupling member 115 is a cylinder-shaped member and has one end fixed to a flange part 111a formed at an opening periphery edge of the antenna 111 and the other end to which an upper end part 121 of the reflecting surface 120a of the reflecting plate 120 is attached at an appropriate portion, as shown. Since the antenna 111 and the reflecting plate 120 are coupled by the coupling member 115 in the shortest distance, there is no leakage of the detection wave reaching the reflecting plate 120 from the antenna 111. Thereby, it is possible to efficiently use oscillation power of the detection wave, there is no unnecessary reflection, which is to be caused due to a leaked detection wave, and there is no phase interference between the unnecessary reflection and the reflection from the iron ore 7a or the coke 7b. As a result, the measurement precision and the reliability are improved.

Further, the antenna 111 is attached with the waveguide 112, and the waveguide 112 is configured to be freely rotatable in a clockwise direction or a counterclockwise direction about an axis line of the waveguide 112, as shown with an arrow X in FIG. 1. For the rotation, a motor-side gear 131 is rotated by a motor 130 and the rotation is transmitted to a waveguide-side gear 132 attached to the waveguide 112.

In the meantime, the waveguide 112 is coupled with the transmitting/receiving unit 110 and the transmitting/receiving unit 110 is also configured to rotate in association with the rotation of the waveguide 112. At this time, when the waveguide 112 and the transmitting/receiving unit 110 are separated by a coupler 135 or the like, it is possible to rotate only the waveguide 112 with the transmitting/receiving unit 110 being stationary.

In the measurement device 100 having the above configuration, the detection wave from the transmitting/receiving unit 110 is transmitted from the antenna. 111, is reflected on the reflecting surface 120a of the reflecting plate 120 and is advanced into the blast furnace 6 throw the opening 6a, as shown with a reference numeral M in FIG. 1. Then, as shown with a reference numeral R in FIG. 1, the detection wave is reflected on the iron ore 7a or the coke 7b deposited in the furnace and is received by the transmitting/receiving unit 110 through the same path. At this time, when the waveguide 112 is rotated by the motor 130, the reflecting plate 120 is rotated together with the antenna 111 and the detection wave is shaken in a direction perpendicular to a paper, so that the surface of the iron ore 7a or the coke 7b deposited in the blast furnace 6 is scanned in a linear manner and a deposition profile of the iron ore 7a or the coke 7b can be thus obtained on the basis of the distance information.

Meanwhile, in the descriptions, the reflecting plate 120 is installed to be perpendicular to the paper so as to show the structure of the measurement device 100, as shown in FIG. 1. However, the measurement device 100 may be entirely rotated forward by 90°. In this case, the detection wave is shaken in a left-right direction of the paper.

According to the present invention, when transmitting and receiving the detection wave, a change in reflection angle by the reflecting surface 120a of the reflecting plate 120 can be implemented simply by rotating the waveguide 112 by a predetermined angle with the motor 130. Therefore, as compared to the method of reciprocally moving the lance 1 as disclosed in Patent Document 1, it is possible to perform the measurement remarkably rapidly. Specifically, it is possible to complete the measurement during one turning of the chute 10. In a general blast furnace, the turning speed of the chute 10 is about 8 rpm and about 7.5 seconds are required for one turning. The measurement device 100 can sufficiently cope with the short-time measurement. For this reason, it is possible to measure the deposition profile of the iron ore 7a or the coke 7b every each turning of the chute 10. Also, when there is an error with respect to a predetermined theoretical deposition profile, it is possible to correct the error rapidly and correctly upon new loading.

Figure 2:
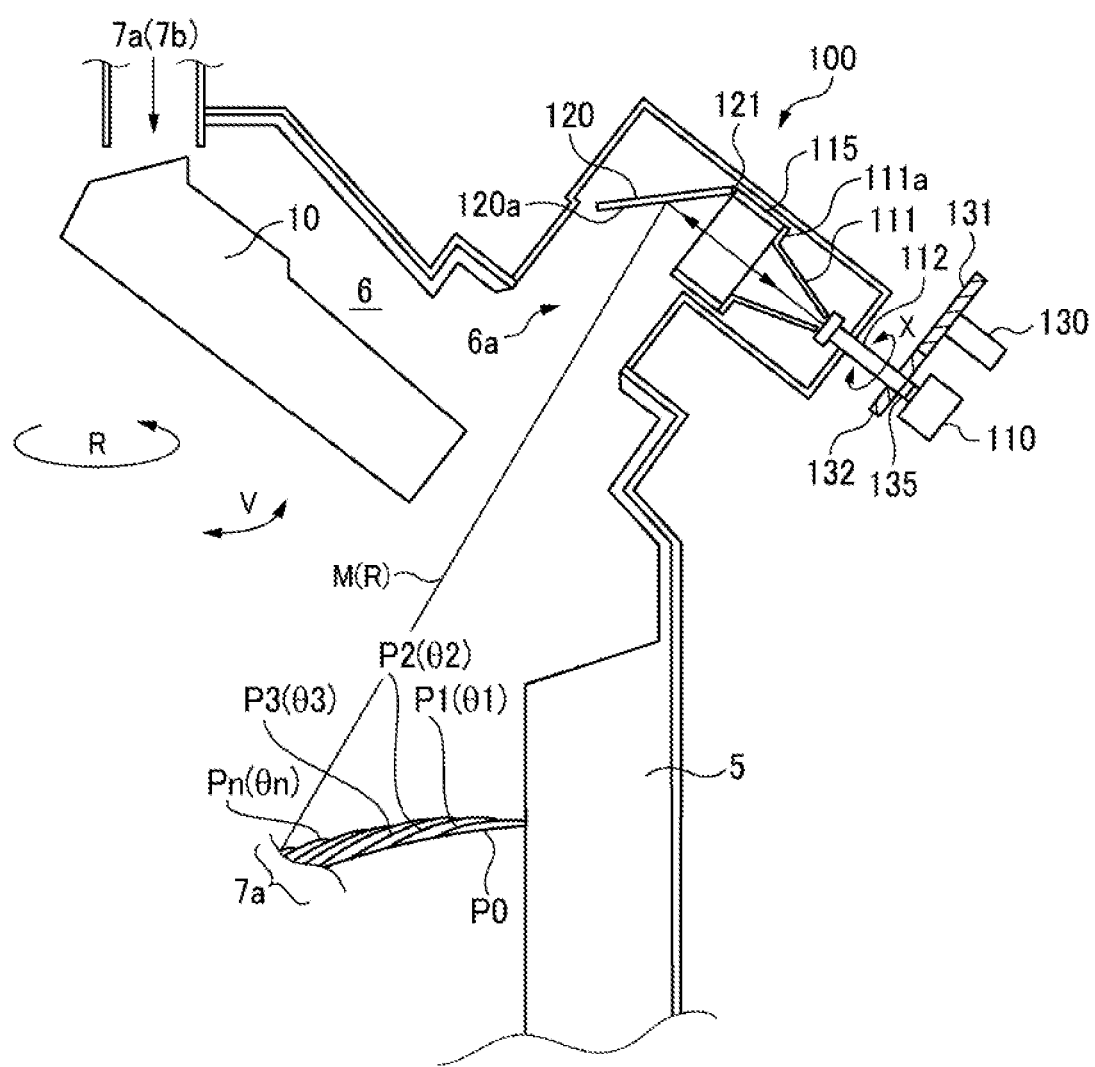
FIG. 2 illustrates a deposition profile of iron ore.

FIG. 2 is a partially enlarged view of FIG. 1, illustrating deposition of the iron ore 7a. A deposition profile of the iron ore 7a deposited in advance is denoted as P0. When the chute 10 is turned in a V direction by a rotating angle $\theta 1$, new iron ore 7a is deposited on the deposition profile P0 from a position corresponding to the rotating angle $\theta 1$ of the chute 10. A deposition profile at that time is measured by the measurement device 100, so that as deposition profile P1 is obtained. Subsequently, when the chute 10 is newly turned in the V direction by a rotating angle $\theta 2$, new iron ore 7a is deposited on the deposition profile P1 from a position corresponding to the rotating angle $\theta 2$ of the chute 10. A deposition profile at that time is measured by the measurement device 100, so that a deposition profile P2 is obtained. The turning of the chute 10 and the measurement by the measurement device 100 are repeated, so that a deposition profile Pn of the iron ore 7a is finally obtained. At this time, it is possible to control an actual turning aspect (the rotating angle in the V direction) of the chute 10 while comparing the deposition profile to the theoretical deposition profile every each turning of the chute 10.

Also for the coke 7b, it is possible to measure as deposition profile every each turning of the chute 10.

In the related art, the deposition profile is measured after depositing the iron ore 7a or the coke 7b thickly to some extent. Therefore, it is difficult to correct the deposition profile upon the new loading so that it coincides with the theoretical deposition profile. However, according to the present invention, since it is possible to measure the deposition profile during the turning of the chute 10 or every each small deposition amount accompanied by one turning, it is possible to easily match the deposition profile with the theoretical deposition profile.

Also, as theoretical value has been determined as to a ratio of a thickness of the deposition layer of the iron ore 7a and a thickness of the deposition layer of the coke 7b. However, since it is possible to measure the fine deposition profile every each turning of the chute 10, as described above, it is not necessary to thickly deposit the coke 7b, unlike the related art, so that it is possible to reduce a using amount of the coke 7b.

In the above descriptions, since the chute 10 is a cylinder-shaped member, a probability that the detection wave from the measurement device 100 will collide with the chute 10 is low and there is no substantial obstacle to the measurement. Even when the detection wave collides with the chute, it is just instantaneous. Further, since the chute 10 is located at a position closer to the furnace top than the iron ore 7a or the coke 7b, the reflected wave R to be detected appears at a specific position and can be thus distinguished from the deposition profile. Also, a detection pattern upon the turning of the chute 10 may be measured, which is then removed from the deposition profile.

Alternatively, when the reflecting plate 120 of the measurement device 100 is installed below the turning position of the chute 10 (at a furnace bottom-side), it is possible to transmit/receive the detection wave without being disturbed by the chute 10.

Also, in order to prevent the chute 10 from being an obstacle, the deposition profile may be measured every each turning of the chute 10.

The signal processing is generally an FMCW method. However, in the FMCW method, a sweep time period and a signal processing time period are included. During the sweep time period, a frequency of an oscillator of the transmitting/receiving unit 110 is swept and a bit signal is sampled to obtain sampling data. During the signal processing time period, the sampling data is subjected to FFT processing to obtain a frequency at which a frequency spectrum of the bit signal is greatest, and the frequency is converted into a distance to obtain a measured distance value. For this reason, when sequential processing is performed for the sweep time period and the signal processing time period, processing time is consumed. Therefore, it is preferably to shorten the time by adopting a toggle buffer for a buffer configured to introduce the sampling data by implementing interrupt processing for control during the sweep time period. Thereby, processing of the sweep time period in which the sampling data is introduced to one side of the toggle buffer, processing of the sweep time period as a result that signal processing of a background can be performed using another sampling data in which the sampling data has been introduced and completed during a previous sweep time period, and processing of the signal processing time period are performed at the apparent same time, so that the processing time can be shortened. For this reason, the measurement of the deposition profile is more rapidly performed together with the detection wave scanning by the measurement device 100.

In the meantime, the theoretical deposition profile enables a deposition state, in which a gas stream distribution in the furnace becomes optimal, to be experimentally obtained, like the related art.

In the above, the chute 10 is controlled to load and deposit the iron ore 7a or the coke 7b so as to coincide with the theoretical deposition profile. However, even when the deposition is made in accordance with the theoretical deposition profile, the iron ore 7a or the coke 7b may slip and separate from an inclined surface on which the iron ore or the coke has been deposited. The main reason is that properties such as a particle size and a moisture amount of the iron ore 7a or the coke 7b assumed when manufacturing the theoretical deposition profile are different from properties of the iron ore 7a or the coke 7b actually loaded.

However, according to the present invention, it is possible to measure an actual deposition profile simultaneously with the turning of the chute 10 or every each turning of the chute. Therefore, when the actually deposited iron ore 7a or coke 7b slides and separates, it is possible to promptly detect the deposition state and to feed the same back to the theoretical deposition profile. In this way, according to the present invention, it is also possible to verify the theoretical deposition profile.

Figure 3:
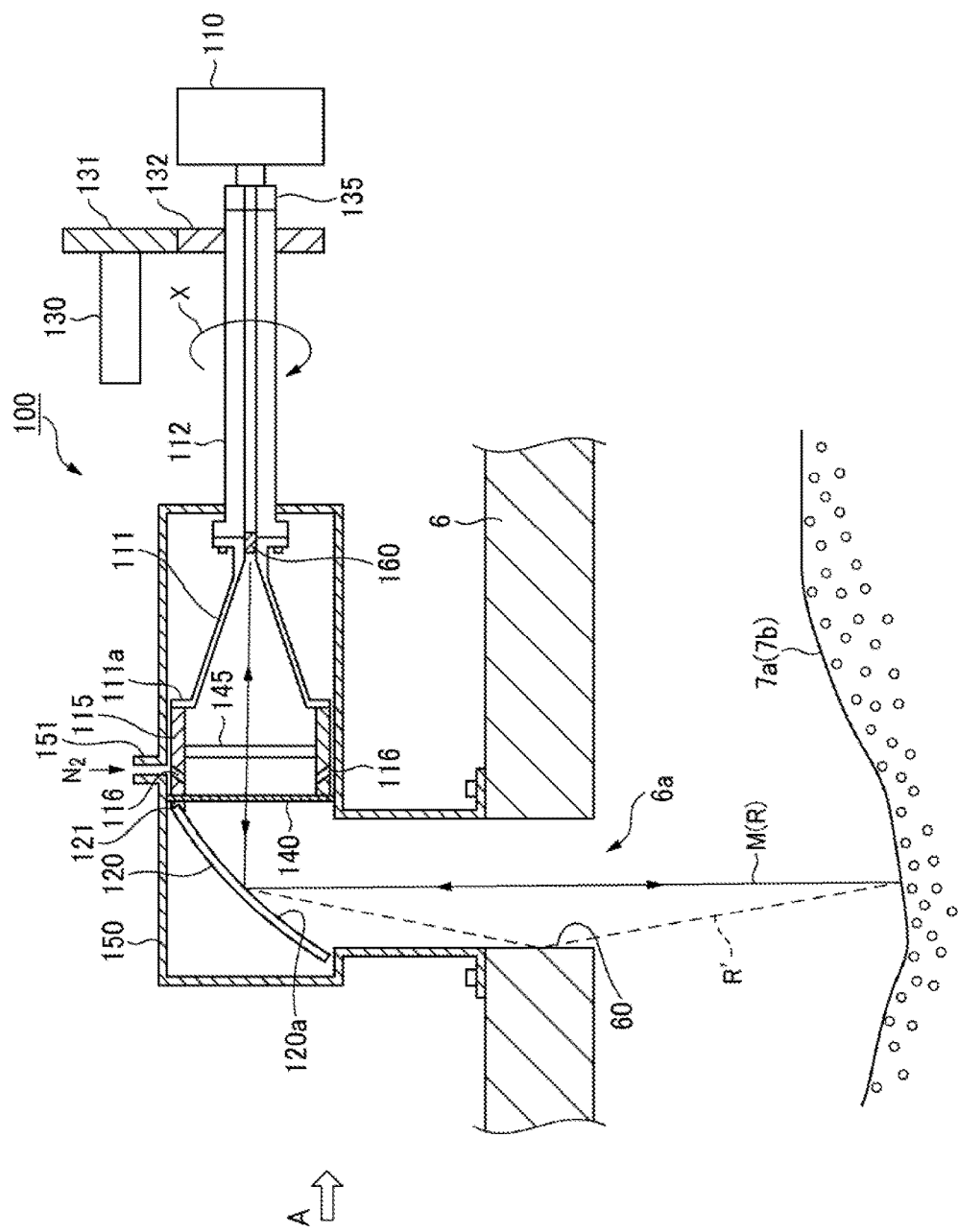
FIG. 3 depicts another example of the measurement device.

In the present invention, the measurement device 100 can be diversely changed. For example, in the above, the horn antenna is used as the antenna 111. However, when a millimeter wave is used as the detection wave, in particular, an entire length of the horn antenna is normally set to about 1,600 mm so as to increase the directionality. Therefore, as shown in FIG. 3, the reflecting surface 120a of the reflecting plate 120 is configured as a concave surface curved into a convex shape toward an opposite side to the antenna surface of the antenna 111, so that it is possible to shorten the horn length of the horn antenna to about 200 mm. In the meantime, a horn opening shape of the horn antenna may be circular or polygonal.

Figure 4:
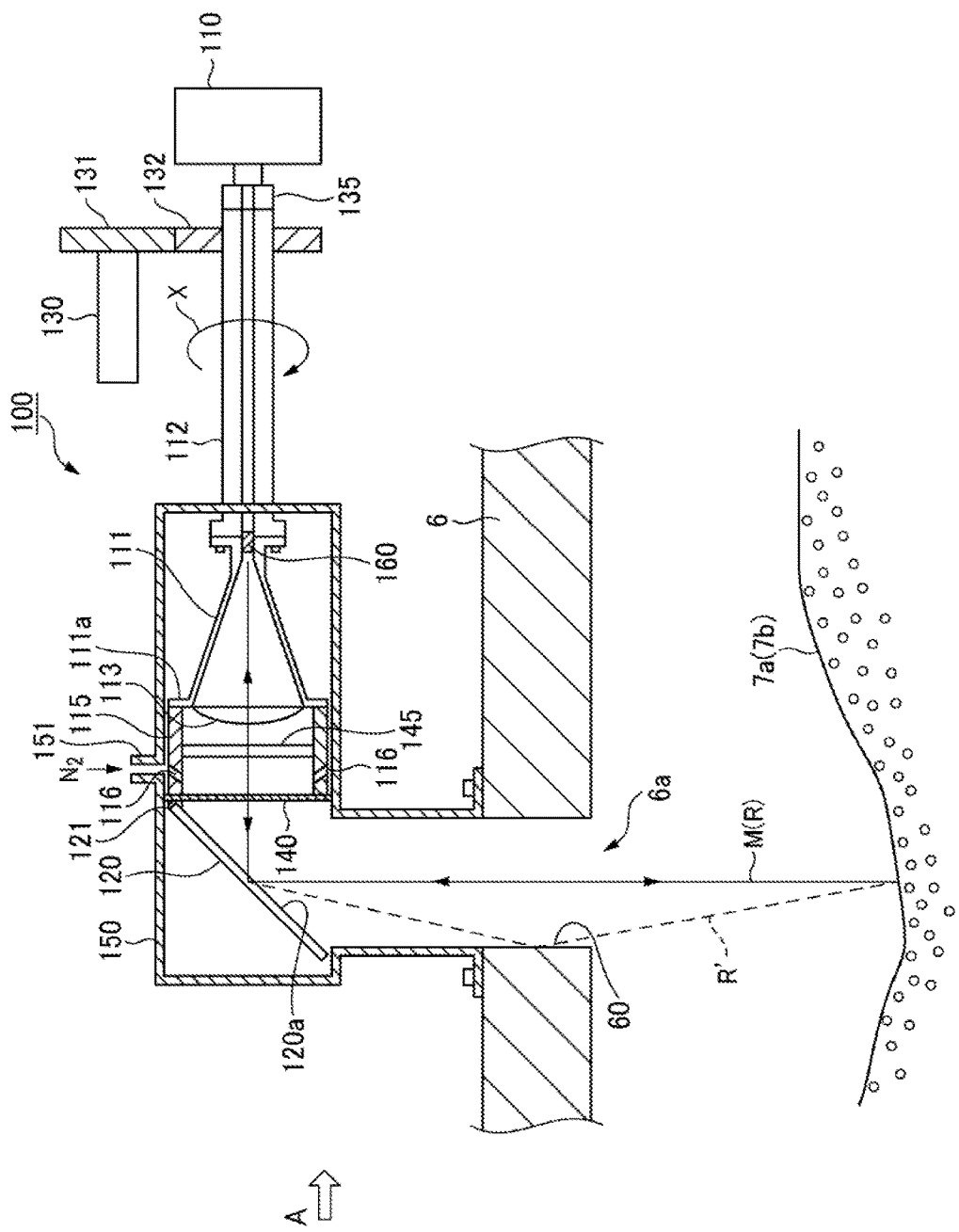
FIG. 4 depicts still another example of the measurement device.

Alternatively, as shown in FIG. 4, a horn antenna having a lens 111 may be configured as the antenna 111. The lens 113 is a half convex-shaped member made of a dielectric material such as ceramic, glass, fluorine resin or the like and can converge and transmit the millimeter wave horn the horn antenna. When a horn antenna having a lens is used, the reflecting surface 120a of the reflecting plate 120 is configured to be planar. Also in this configuration, it is possible to shorten the horn length of the horn antenna.

In the meantime, a parabolic antenna may also be used as the antenna 111. In this case, the lens 113 is not provided and the reflecting surface 120a of the reflecting plate 120 is configured to be planar.

Also, dusts and gases of high temperatures are introduced to the reflecting plate 120 from the blast furnace 6 through the opening 6a. Therefore, as shown in FIG. 3, n opening of the coupling member 115 is covered by a porous filter 140 made of a material through which the detection wave passes. As the filter 140, a fabric made of "Tyranno fiber" available from Ube Industries, Ltd. may be used. The Tyranno fiber is a ceramic fiber consisting of silicon, titanium, zirconium, carbon and oxygen. When the Tyranno fiber is knitted in a planar manner, a heat-resistant porous material is obtained.

Further, a non-porous heat-resistant partition wall 145 made of a material through which gases such as air and solids such as dusts do not pass and the detection wave passes may be installed at an appropriate part between the filter 140 of the coupling member 115 and the antenna 111, thereby partitioning a space between the filter 140 and the antenna 111. The non-porous partition wall 145 may be a ceramic board, for example. By the non-porous partition wall 145, it is possible to block the heat from the blast furnace 6.

The reflecting plate 120, the filter 140, the non-porous partition wall 145 and the antenna 111 are accommodated in a pressure-resistant vessel 150, and a high-pressure inert gas (for example, nitrogen gas) is supplied to the pressure-resistant vessel 150 through a gas supply port 151. The coupling member 115 is formed with a plurality of air holes 116 tilted toward the filter, and the gas supply port 151 is provided in the vicinity of an area immediately above the coupling member 115. When the waveguide 112 is rotated, the coupling member 115 is correspondingly rotated, so that when the air holes 116 reach the gas supply port 151, the inert gas from the gas supply port 151 is ejected toward the filter 140 through the air holes 116. Resultantly, it is possible to brush down the dusts attached to the filter 140 from the interior of the furnace. Also, since the inert gas passes through the filter 140 and reaches the reflecting surface 120a of the reflecting plate 120, too, it is also possible to brush down the dusts attached to the reflecting surface 120a.

In the meantime, when the air holes 116 of the coupling member 115 do not exist in the vicinity of the gas supply port 151, the inert gas from the gas supply port 151 is supplied to a gap between the pressure-resistant vessel 150 and the coupling member 115. Therefore, it is possible to prevent the dusts from being introduced into the gap and to remove the dusts introduced into the gap.

In this way, as the coupling member 115 is rotated, the air holes 116 reach the gas supply port 151 and separate from the gas supply port 151, repeatedly so that the flow of the inert gas changes, the coupling member 115 vibrates and the vibration is transmitted to the filter 140, too. By the vibration, the dusts attached to the filter 140 are brushed down. Further, whenever the reflecting plate 120 is rotated in forward and reverse directions, the motor-side gear 131 and the waveguide-side gear 132 are switched in opposite directions. Therefore, the vibrations at that time are transmitted to the antenna 111, the coupling member 115 and the filter 140 through the waveguide 112, so that the dusts attached to the filter 140 are brushed down by the vibrations.

As described above, the heat from the blast furnace 6 is blocked by the non-porous partition wall 145. In order to further secure the heat insulation, a plug member 160 made of a material through which the detection wave passes, such as fluorine resin, ceramics or the like, may be inserted to a coupling part between the antenna 111 and the waveguide 112 or to a position of the waveguide 112 closer to the transmitting/receiving unit 110.

In addition, although not shown, a part of the pressure-resistant vessel 150 just above the reflecting plate 120 and the filter 140 may be opened to prepare a window. During the non-measurement, the waveguide 112 and the reflecting plate 120 may be rotated by 180° so as to make the reflecting surface 120a and the filter 140 face the window. Thereby, it is possible to observe a situation where the dusts are attached to the reflecting surface 120a and the filter 140. As described above, the reflecting surface 120a and the filter 140 can remove the attached dusts by the inert gas or the vibrations. However, the removal may be insufficient. In this case, as a result of the observation on the dust attachment situation through the window, when it is determined that it is necessary to remove the dusts, it is possible to perform a cleaning operation by opening the window.

In this way, during the non-measurement, the backside (an opposite surface to the reflecting surface 120a) of the reflecting plate 120 faces the opening 6a of the blast furnace 6 by rotating the waveguide 112 and the reflecting plate 120 by 180°. Therefore, even when the iron ore or the coke blown up from the blast furnace 6 comes flying to the device through the opening 6a, a situation where the iron ore or the coke collides with the backside of the reflecting plate 120 to break down the filter 140 does not occur.

Also, a partition valve may be provided between the opening 6a of the blast furnace 6 and the measurement device 100, for example at a coupling part 131 of the pressure-resistant vessel 150, and may be opened during the measurement and may be closed during the non-measurement.

Figure 5:
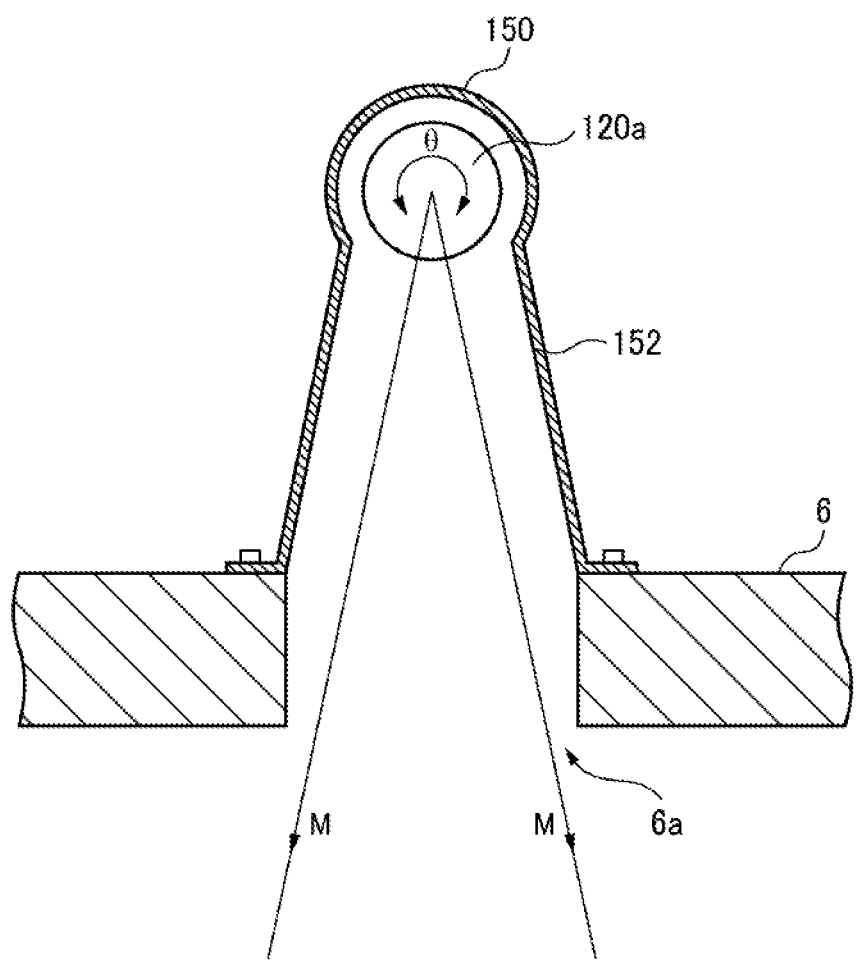
FIG. 5 is a sectional view as seen from an arrow A direction of FIG. 3 or 4.

Further, as described above, the detection wave is shaken in the direction perpendicular to the paper. At this time, in order not to interrupt the traveling of the detection wave, the coupling part 152 of the pressure-resistant vessel 150 with the opening 6a is formed to have a fan shape where a diameter gradually increases toward the blast furnace in correspondence to the rotating angle θ (a shaking width) of the reflecting surface 120a of the reflecting plate 120, as shown in FIG. 5.

The measurement device 100 is configured to couple and rotate the antenna 111 and the reflecting plate 120 in the same direction. Therefore, the micrometer wave or the millimeter wave is transmitted into the blast furnace and received with being shaken in a linear manner. That is, the micrometer wave or the millimeter wave is scanned in the linear manner in the direction perpendicular to the paper, so that a linear surface profile is obtained. As described above, if the surface profile can be measured over the entire surface in the furnace, it is possible to perform the loading operation more correctly. Therefore, in the measurement device 100, the reflecting plate 120 is configured to change the inclined angle of the reflecting surface 120a toward the furnace, in addition to the rotating direction X of the waveguide 112.

Figure 6:
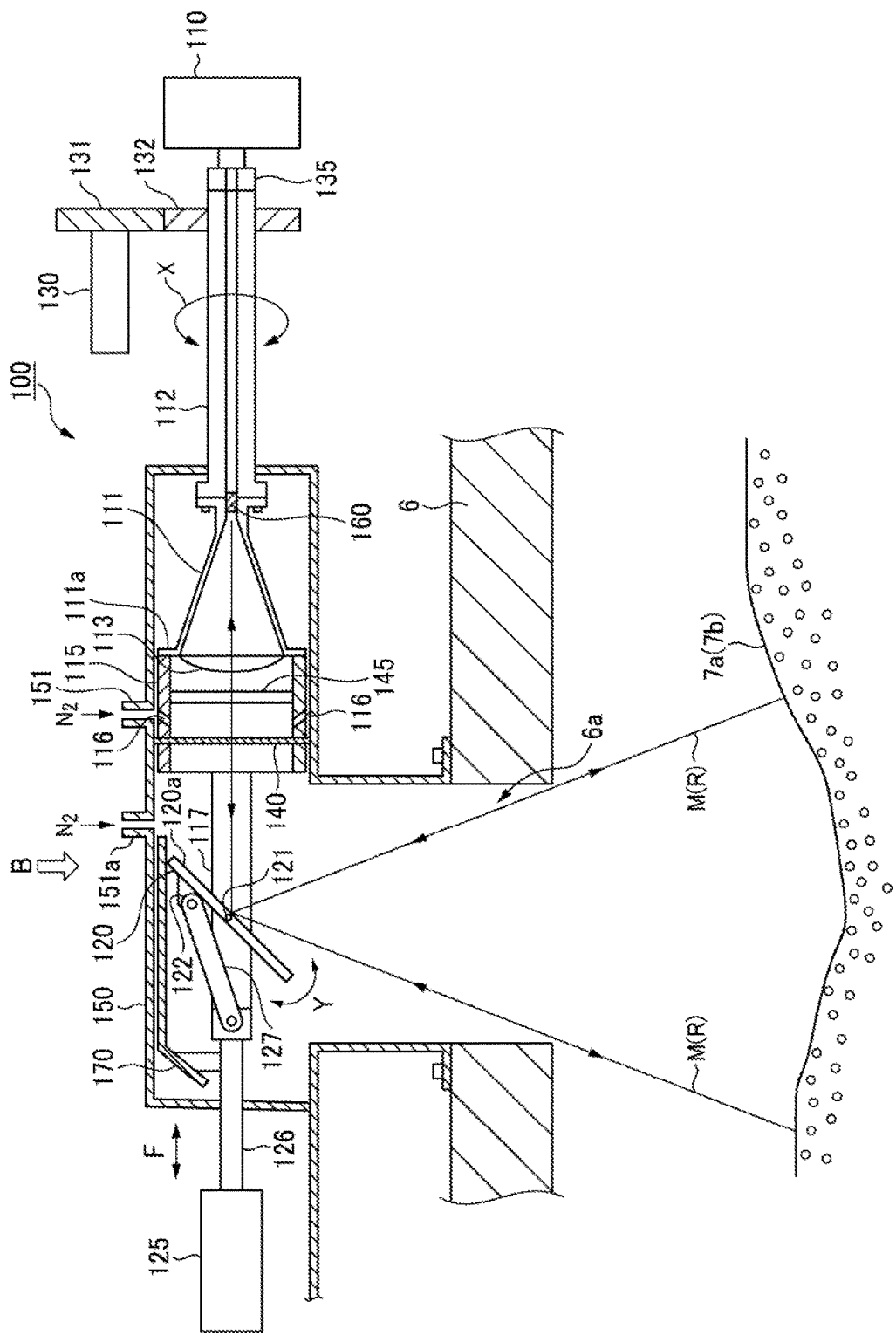
FIG. 6 depicts an example of the measurement device capable of scanning a surface of the loaded material in a planar manner.
Figure 7:
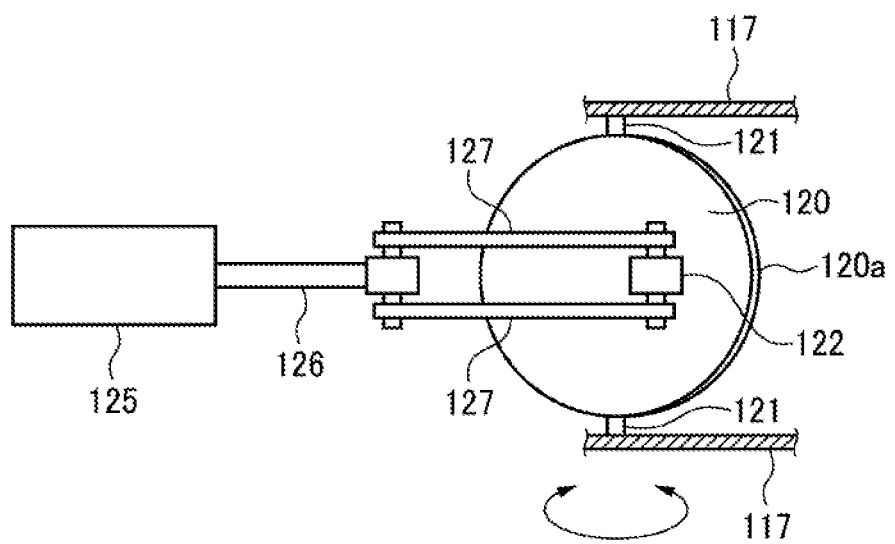
FIG. 7 depicts a structure around a reflecting plate of the measurement device shown in FIG. 6, as seen from an arrow B direction.

FIG. 6 and FIG. 7 (as seen from an arrow B direction of FIG. 6) depict an example of the measurement device. In the shown measurement device 100, pin-shaped support shafts 121, 121 are provided with protruding at both diametrical ends of the reflecting plate 120. The support shafts 121, 121 are supported by two support members 117, 117 extending from the coupling member 115 so that they are flush with the axis line of the waveguide 112 in the horizontal direction. For this reason, the reflecting plate 120 is supported so that it can be freely rotatable in an arrow Y direction about the support shafts 121, 121, and is configured to rotate in the same direction (an arrow X direction) as the antenna 111 by the waveguide rotating unit via, the coupling member 115 and the support members 117, 117, as described above.

Also, the backside of the reflecting plate 120 is provided with an attachment piece 122 at a horizontal position above the support shafts 121, 121 and is coupled with rod-shaped members 127 to be coupled to a tip portion of a piston rod 126 of the cylinder 125. In the meantime, in FIGS. 6 and 7, the attachment piece 122 is provided above the support shaft 121 but may be provided below the support shaft 121. When the cylinder 125 is driven, the piston rod 126 is advanced (rightward in FIGS. 6 and 7) or retreated (leftward in FIGS. 6 and 7), as shown with an arrow F. When the piston rod 126 is advanced, the attachment piece 122 is also moved toward the antenna in conjunction with the rod-shaped members 127 and the reflecting plate 120 is correspondingly inclined so that the reflecting surface 120a faces toward the blast furnace. On the other hand, when the piston rod 125 is retreated, the attachment piece 122 is moved in an opposite direction to the antenna and the reflecting plate 120 is correspondingly inclined so that the reflecting surface 120a faces toward the antenna. By this link mechanism, it is possible to rotate the reflecting plate 120 in the arrow Y direction about the support shafts 121, 121 through the driving of the cylinder 125. Thereby, the micrometer wave or the millimeter wave is transmitted into the furnace with being shaken in the left-right direction in FIG. 6, as shown with a reference numeral M(R).

Also, it is possible to two-dimensionally scan the micrometer wave or the millimeter wave by combining the rotations of the reflecting plate 120 in the X direction and the Y direction. At this time, the rotation in the X direction is performed by the motor 130 and the gears 131, 132 for rotating the waveguide 112 and the rotation in the Y direction is performed by the cylinder 125. Therefore, as compared to a configuration where the control on the tilting of the reflecting plate 120 in the X direction and the Y direction is performed by one device, like Patent Document 2, it is possible to simply perform the control and to additionally shorten the time necessary for the scanning.

Also in this case, it is preferably to prevent the dusts and the like from being attached to the reflecting surface 120a. To this end, a gas supply port 151a is provided in the vicinity of the upper end of the reflecting plate 120 and the high-pressure inert gas (for example, nitrogen gas) is supplied to the pressure-resistant vessel 150 from the gas supply port. In the measurement device 100 shown in FIGS. 3 and 4, the inert gas is sprayed through the filter 140. However, herein, since the reflecting plate 120 is spaced from the filter 140, the inert gas from the filter 140 does not sufficiently reach the reflecting surface 120a. Therefore, the gas supply port 151a is provided in the vicinity of the reflecting plate 120 and the inert gas is directly sprayed to the reflecting surface 120a.

Also, the opening 6a is wide, so that the piston rod 126 and the rod-shaped members 127 are exposed. Therefore, the iron ore 7a or the coke 7b blown up from the interior of the furnace directly collides with the corresponding members, Regarding this a metallic cover 170 is mounted over the entire backside of the reflecting plate 120. During the non-measurement, the metallic cover is rotated by 180° together with the antenna 111 and the reflecting plate 120, so that the cover 170 is moved toward the opening to protect the piston rod 126, the rod-shaped members 127 and the reflecting plate 120 from the collision of the iron ore 7a or the coke 7b from the interior of the furnace and to prevent the introduction of the dusts. Alternatively, although not shown, a guard member made of a material through which the micrometer wave or the millimeter wave passes may be provided so as to block the opening 6a.

The other configurations are the same. For example, the partition wall 145 may be provided, a simple horn antenna as shown in FIG. 3 may be adopted instead of the horn antenna having a lens, and the reflecting surface 120a may be curved. However, since the micrometer wave or the millimeter wave is two-dimensionally scanned, a pyramid shape or a conical shape of which an opening diameter gradually increases toward the opening 6a of the blast furnace 6 is adopted instead of the coupling part 152 shown in FIG. 5 so as not to interrupt the traveling of the micrometer wave or the millimeter wave.

Figure 8:
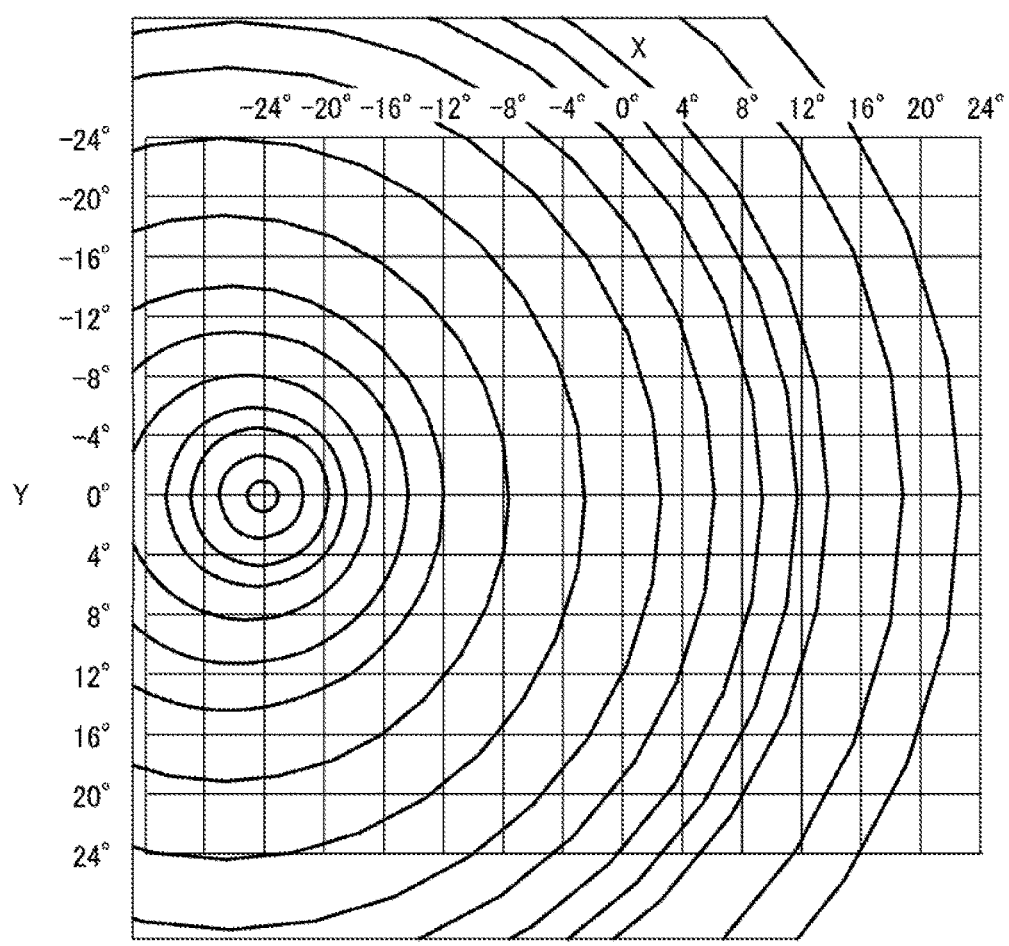
FIG. 8 illustrates a scanning aspect when scanning the surface of the loaded material in the planar manner.

FIG. 8 is a schematic view illustrating a scanning aspect where the interior of the furnace is scanned in the planar manner by using the measurement device 100 configured to rotate the reflecting plate 120 in the Y direction. FIG. 9 depicts an example of the result. As shown in FIG. 9, a distance distribution to the loaded material is obtained in a three-dimensional manner (a plane-shaped distribution and a depth distribution) by the rotations of the reflecting plate 120 in the X direction and the Y direction. In the meantime, a numerical value on an X-axis of FIG. 9 indicates the rotating angle of the reflecting plate 120 in the X direction, a numerical value on a Y-axis indicates the rotating angle of the reflecting plate 120 in the Y direction, and each plot indicates a distance to the loaded material surface when the reflecting plate is rotated by some angles in the X direction and the Y direction. For example, a plot P indicates a distance to the loaded material, which was obtained when the reflecting plate 120 was rotated by −24° in the X direction and by −20° in the Y direction and the micrometer wave or the millimeter wave was transmitted into the furnace, and information of a reflection position and a depth at the corresponding position is obtained. The plots are continuously obtained in the X direction and the Y direction, so that a three-dimensional surface profile of the loaded material can be obtained. Then, the surface profile is converted into a radial profile from the furnace core, so that it is possible to prepare a profile with which it is easy to see a circumference balance. Also, it is possible to increase measurement ranges in the X direction and the Y direction by increasing the rotating angles of the reflecting plate 120 in the X direction and the Y direction.

Herein, line profiles corresponding to six angles of each of upper and lower sides with an angle 0° in the Y direction being interposed therebetween are all the same if the circumference balance is made. For this reason, when there is a difference between the profiles, it can be determined that the circumference balance is not made and an abnormal condition alarm may be generated, for example. Also, the profile (L profile) of the angle 0° in the Y direction is referred to as "reference profile." When a profile different from the reference profile is expressed, it can be determined that an abnormal condition has occurred.

Figure 10:
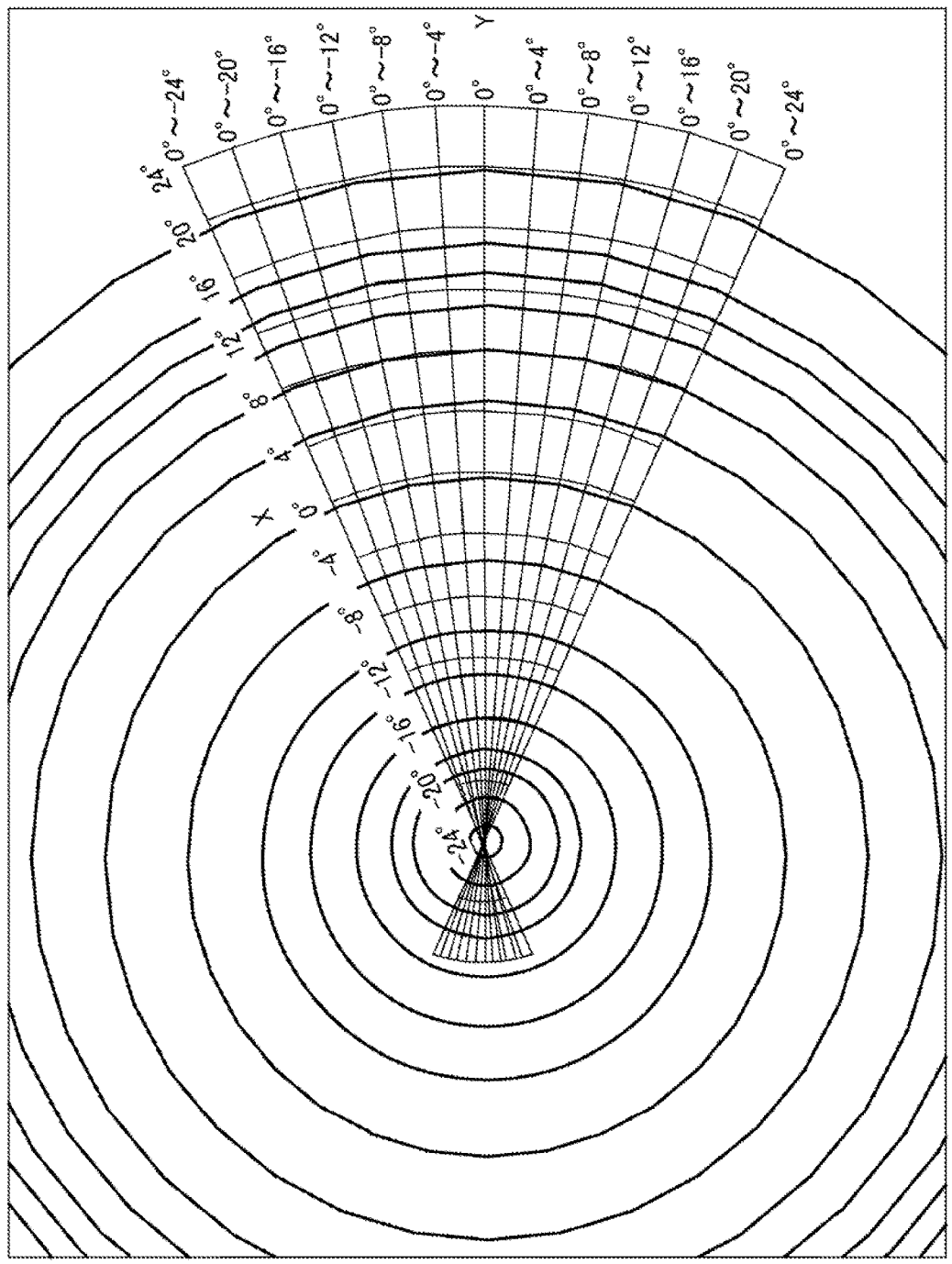
FIG. 10 illustrates a scanning aspect when scanning the surface of the loaded material in a fan-shaped manner.
Figure 11:
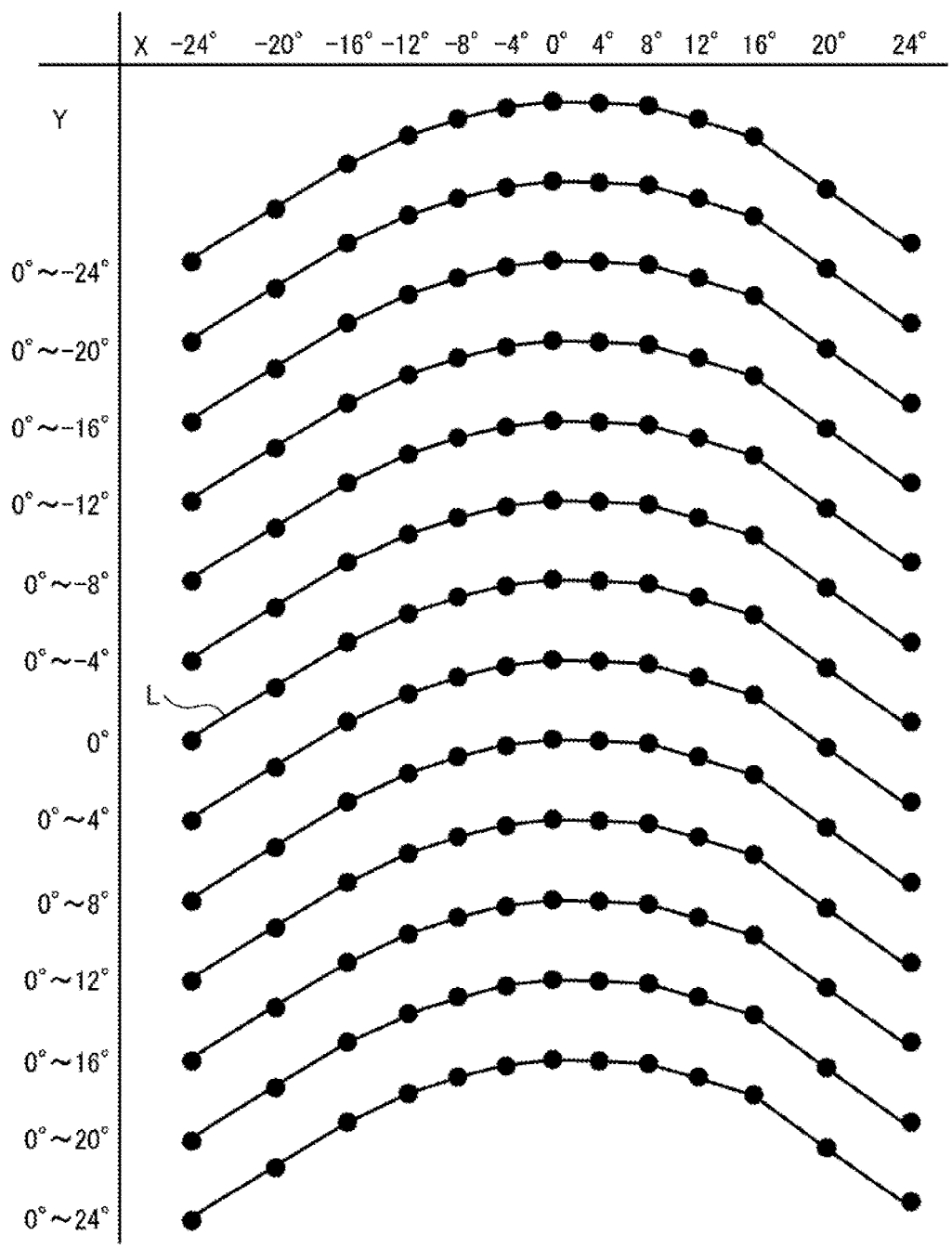
FIG. 11 depicts a three-dimensional profile, which is to be obtained by the scanning in the fan-shaped manner.
Figure 12:
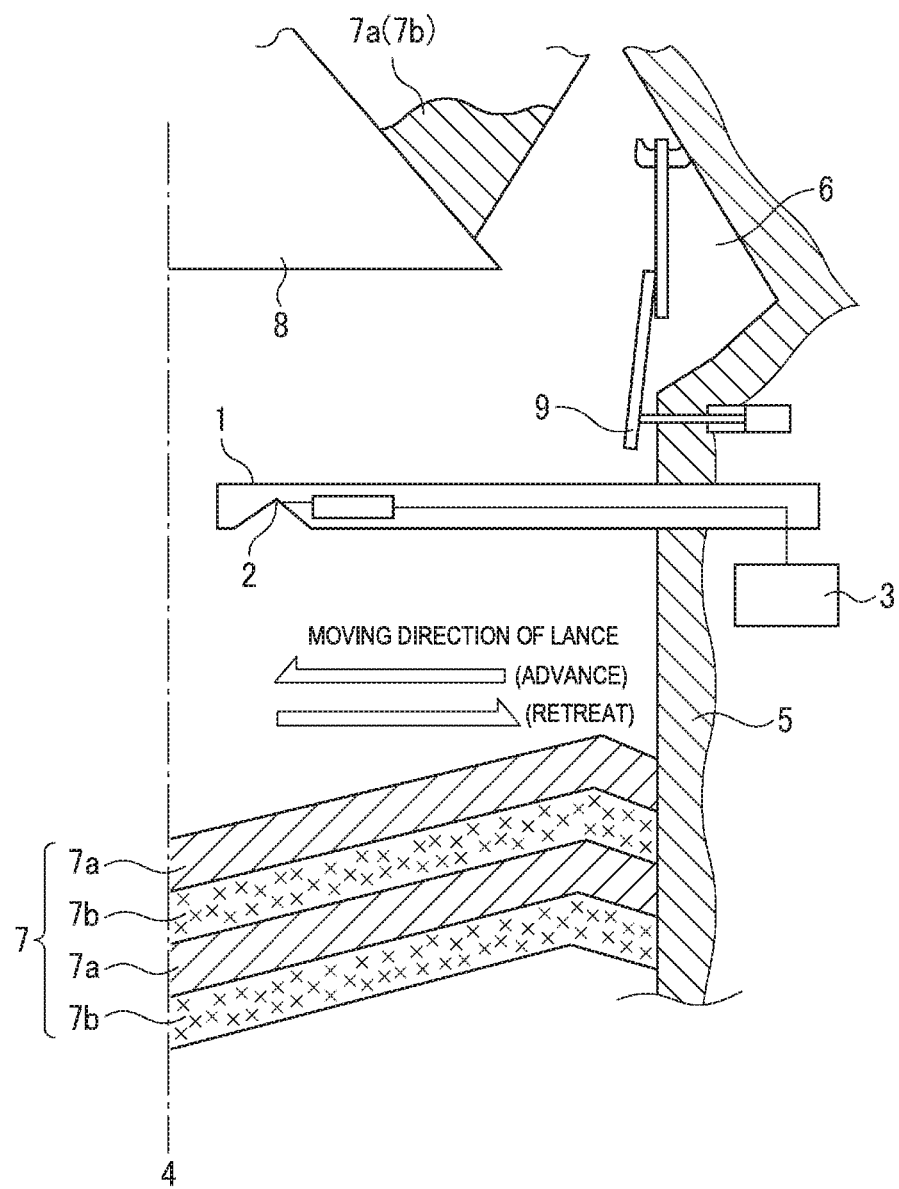
FIG. 12 depicts a method for measuring a deposition profile in accordance with the related art.

Also, the interior of the furnace may be scanned in a fan-shaped manner by using the measurement device 100 configured to rotate the reflecting plate 120 in the Y direction, too, as shown in FIG. 10. FIG. 11 is a schematic view showing the result. In order to perform the scanning in the fan-shaped manner, the rotating angles of the reflecting plate 120 in the X direction and the Y direction are gradually increased from the furnace core (X=−24°, Y=0°). Also in this case, if the circumference balance is made, all the profiles are the same. However, when there is a difference between the profiles, an abnormal condition alarm may be generated.

As shown in FIGS. 1, 9 and 11, the loaded material is deposited so that it gradually deepens toward a center of the furnace. Ideally, degrees of inclination at respective parts are the same. However, since the degrees of inclination at respective parts are different, the turning speed of the chute 10 is changed to regulate the supply amount of the iron ore 7a or the coke 7b so that the degrees of inclination at respective parts are the same, based on the surface profile shown in FIG. 9 or 11, in addition to the above alarm notification.

In the meantime, like the measurement device 100 shown in FIGS. 1 to 4, when the reflecting plate 120 is rotated only in the X direction, only the linear surface profile in the X direction is obtained, like the line L denoted with Y=0° shown in FIG. 9 or 11 and cannot be compared to degrees of inclination of other lines, which are to be obtained when the reflecting plate is rotated in the Y direction. In contrast, as described above, the surface profile is measured three-dimensionally, so that it is possible to deposit the iron ore 7a or the coke 7b to be closer to the theoretical profile. Thereby, it is possible to operate the blast furnace at a more favorable state.

Also, when correction control of the surface profile by the chute 10 and control of a powdered coal supply device to be provided at a tuyere are correlatively performed, it is possible to regulate an amount of the coke to be supplied into the furnace to the necessary minimal amount, thereby reducing an amount of consumption, as compared to the related art.

In addition to the change in the configuration of the measurement device 100 as described above, a rotating wave of which a direction of an electric field rotates in a clockwise direction or a counterclockwise direction is preferably used as the detection wave. The detection wave reflected from the surface of the iron ore 7a or the coke 7b may be reflected (R') on a wall surface 60 of the opening 6a of the blast furnace 6, which disturbs the correct measurement. The rotating wave has a property that a rotating direction is reversed by the reflection. Therefore, the detection wave (R) reflected only from the surface of the iron ore or the coke C and the detection wave (R') additionally reflected from the wall surface 60 of the opening 6a are different in terms of the number of reflection times, so that it is possible to distinguish the received detection wave by the rotating direction of the electric field.

That is, for example, when the rotating wave of the clockwise direction is transmitted, it is reflected on the reflecting plate 120 to be the rotating wave of the counterclockwise direction and is incident on the iron ore 7a or the coke 7b, and the reflected wave thereof becomes the rotating wave of the clockwise direction and is reflected on the reflecting plate 120 to be the rotating wave of the counterclockwise direction, which is then received. On the other hand, in the case of the reflection on the wall surface 60 of the opening 6a, the rotating wave of the clockwise direction reflected on the surface of the iron ore 7a or the coke 7b becomes the rotating wave of the counterclockwise direction when it is reflected on the wall surface 60 of the opening 6a, and is reflected on the reflecting plate 120 to be the rotating wave of the clockwise direction, which is then received. Therefore, when only the rotating wave of the counterclockwise direction is received, it is possible to exclude the rotating wave (R') reflected on the wall surface 60 of the opening 6a and to thus realize the correct measurement.

Meanwhile, in order to generate the rotating wave, a 90° phase plate made of a dielectric material is preferably mounted to an inner wall of the waveguide 112, for example, irrespective of the well-known methods.

Although the present invention has been described in detail with reference to the specific illustrative embodiment, it is obvious to one skilled in the art that a variety of changes and modifications can be made without departing from the spirit and scope of the present invention.

The subject application is based on a Japanese Patent Application No. 2014-41909 filed on Mar. 3, 2014 and a Japanese Patent Application No. 2014-150765 filed on Jul. 24, 2014, which are herein incorporated by reference.

INDUSTRIAL APPLICABILITY

According to the present invention, it is possible to correctly and rapidly measure the surface profile of the iron ore or the coke loaded and deposited in the blast furnace, so that it is possible to perform the blast furnace operation more favorably.

DESCRIPTION OF REFERENCE NUMERALS

6: blast furnace
7a: iron ore
7b: coke
10: chute
100: measurement device
110: transmitting/receiving unit
111: antenna
112: waveguide
115: coupling member
117: support member
120: reflecting plate
121: support shaft
122: attachment piece
125: cylinder
126: piston rod
127: rod-shaped member
130: motor
131: motor-side gear
132: waveguide-side gear
140: filter
145: non-porous partition wall
150: pressure-resistant vessel
151, 151a: gas supply port
152: coupling part
170: cover

The invention claimed is:

1. A method for loading and depositing a loaded material in a blast furnace by a chute, the method comprising:
completing a transmitting/receiving operation of scanning a surface of the loaded material by a detection wave transmitted for a surface detection device within one turning of the chute or within a prescribed number of turning times of the chute; and
loading the loaded material while measuring a surface profile of the loaded material during the turning of the chute or every each prescribed turn of the chute, wherein,
the surface detection device comprises:
a reflecting plate installed just above an opening provided in a vicinity of a top of the blast furnace and having a reflecting surface inclined toward the opening, an antenna installed to face the reflecting surface of the reflecting plate, and a waveguide configured to couple the antenna and a detection wave transmitting/receiving unit, the surface detection device configured to transmit a detection wave from the antenna to the reflecting surface of the reflecting plate, to enable the detection wave to enter the furnace through the opening, to enable the detection wave reflected from the loaded material in the furnace to return to the reflecting surface of the reflecting plate through the opening, to send the detection wave reflected from the loaded material in the furnace to the antenna, to detect the detection wave reflected from the loaded material in the furnace by the detection wave transmitting/receiving unit and to detect a distance to a surface of the loaded material or a surface profile of the loaded material,
a waveguide rotating unit configured to rotate the waveguide about an axis line of the waveguide by a predetermined angle, and
the antenna and the reflecting plate mechanically coupled by a coupling member and the reflecting plate is configured to rotate about the axis line of the waveguide together with rotation of the antenna by the waveguide rotating unit.

2. The method according to claim 1, wherein a deposition profile of the loaded material is obtained on the basis of the surface profile and is compared to a predetermined theoretical deposition profile, and the chute is controlled so as to correct an error with respect to the theoretical deposition profile and then a new loaded material is loaded.

3. A surface detection device of a loaded material in a blast furnace, which comprises a reflecting plate installed just above an opening provided in the vicinity of a top of the blast furnace and having a reflecting surface inclined toward the opening, an antenna installed to face the reflecting surface of the reflecting plate, and a waveguide configured to couple the antenna and a detection wave transmitting/receiving unit, wherein the device is configured to transmit a detection wave from the antenna to the reflecting surface of the reflecting plate, to enable the detection wave to enter the furnace through the opening, to enable the detection wave reflected from the loaded material in the furnace to return to the reflecting surface of the reflecting plate through the opening, to send the same to the antenna, to detect the detection wave by the detection wave transmitting/receiving unit and to detect a distance to a surface of the loaded material or a surface profile of the loaded material, said device comprising:
a waveguide rotating unit configured to rotate the waveguide about an axis line of the waveguide by a predetermined angle,
wherein the antenna and the reflecting plate are mechanically coupled by a coupling member and the reflecting plate is configured to rotate about the axis line of the waveguide together with rotation of the antenna by the waveguide rotating unit.

4. The surface detection device of a loaded material in a blast furnace according to claim 3, further comprising:
a reflecting plate rotating unit configured to tilt the reflecting surface toward an antenna-side and an opposite side to the antenna by a predetermined angle,
wherein the detection wave is two-dimensionally scanned by the reflecting plate rotating unit and the waveguide rotating unit.

5. The surface detection device of a loaded material in a blast furnace according to claim 4, wherein the reflecting plate rotating unit is provided on the axis line of the waveguide on a backside of the reflecting plate and is configured to rotate integrally with the waveguide.

6. The surface detection device of a loaded material in a blast furnace according to claim 4, wherein support shafts are attached at both diametrical ends of the reflecting plate and the reflecting plate is connected to a support member extending from the coupling member so that it can be freely rotatable about the support shafts, and
wherein the reflecting plate rotating unit comprises a piston rod configured to linearly move toward the antenna-side or the opposite side to the antenna along the axis line of the waveguide and a rod-shaped member having one end attached to a tip of the piston rod and the other end attached to the backside of the reflecting plate with deviating upward or downward from a center of rotation of the reflecting plate, and is configured to move an attachment part between the other end of the rod-shaped member and the backside of the reflecting plate toward the antenna-side or the opposite side to the antenna by the piston rod.

7. The surface detection device of a loaded material in a blast furnace according to claim 3, wherein the antenna is a horn antenna and the reflecting surface of the reflecting plate is a concave surface curved into a convex shape toward an opposite side to an antenna surface of the antenna.

8. The surface detection device of a loaded material in a blast furnace according to claim 3, wherein the antenna is a horn antenna having a lens and the reflecting surface of the reflecting plate is a planar surface.

9. The surface detection device of a loaded material in a blast furnace according to claim 3, wherein an opening of the antenna is covered by a non-porous partition wall formed of a heat resistant material.

10. The surface detection device of a loaded material in a blast furnace according to claim 9, wherein a filter made of a heat resistant material is disposed on a front surface of the non-porous partition wall facing toward the reflecting plate.

11. The surface detection device of a loaded material in a blast furnace according to claim 3, further comprising a gas supply port for supplying an inert gas onto the reflecting surface of the reflecting plate.

12. The surface detection device of a loaded material in a blast furnace according to claim 3, wherein during non-measurement, the reflecting plate is rotated by 180° together with the waveguide, thereby making a backside of the reflecting plate face the opening of the blast furnace.

* * * * *